United States Patent [19]

Gularte

[11] 4,041,672

[45] Aug. 16, 1977

[54] APPARATUS FOR BUNCHING BROCCOLI AND A METHOD THEREFOR

[76] Inventor: David L. Gularte, 1011 W. Alisal No. 4, Salinas, Calif. 93901

[21] Appl. No.: 708,498

[22] Filed: July 26, 1976

[51] Int. Cl.² .......................................... B65B 13/20
[52] U.S. Cl. ........................................... 53/3; 53/23; 53/123; 53/124 D; 83/409.2
[58] Field of Search ................... 53/3, 23, 123, 124 D; 83/435.2, 409.2

[56] References Cited

U.S. PATENT DOCUMENTS

| 2,180,349 | 11/1939 | De Back | 53/123 |
| 2,685,771 | 8/1954 | Magnuson et al. | 53/210 X |
| 2,769,291 | 11/1956 | Christensen et al. | 53/123 |
| 3,393,633 | 7/1968 | Hoffman et al. | 53/3 X |

Primary Examiner—Travis S. McGehee
Attorney, Agent, or Firm—Boone, Schatzel, Hamrick & Knudsen

[57] ABSTRACT

Apparatus for bunching vegetables having a stalk comprising a frame, a chain formed into an endless band, a motor mounted to the frame for recirculatingly driving the chain in a generally elongated loop, a plurality of members affixed to the chain, each member including a vegetable holding portion and a clamping portion, the holding portion being capable of supporting a plurality of heads of vegetables with their stalks extending in a direction generally normal to the plane of the loop, the clamping portion being movable between an open and a closed position such that when it is in the open position vegetables are able to be placed in the holding portion and when it is in the closed position it clamps the stalks of the vegetables in the holding portion, a cam plate connected to the frame and disposed in the path of the clamping portion for moving the clamping portion from the open to the closed position, and a rotary saw for removing portions of the stalks when the clamping portion is in the closed position, whereby when the chain is driven and after vegetables are inserted into the holding portion, the cam plate engages the clamping portion and moves it from the open to the closed position so that continued movement of the chain drives the clamped stalks past the saw which in turn removes undesired portions of the stalks so as to form the vegetables into a predetermined length and hence enables the stalks to be bound with an elastic band that serves to maintain the vegetables in a bunch, and whereby when the clamping portion moves into the open position out of engagement with the cam plate, the bunch of vegetables is capable of being removed from the holding portion, and a method therefor.

18 Claims, 7 Drawing Figures

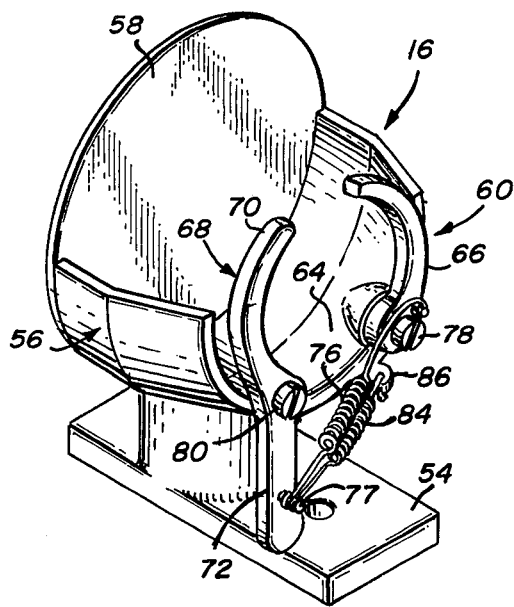
Fig_2
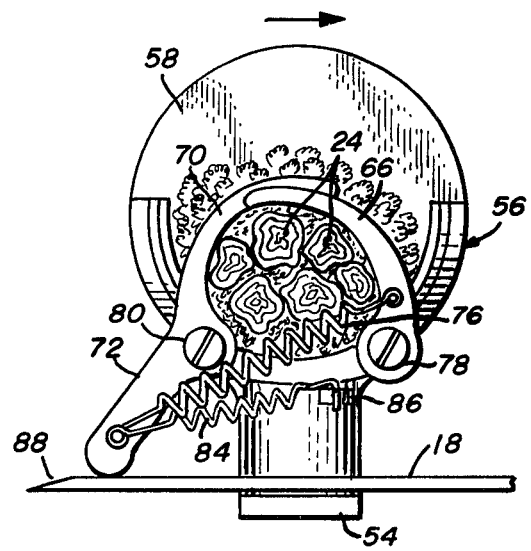
Fig_3
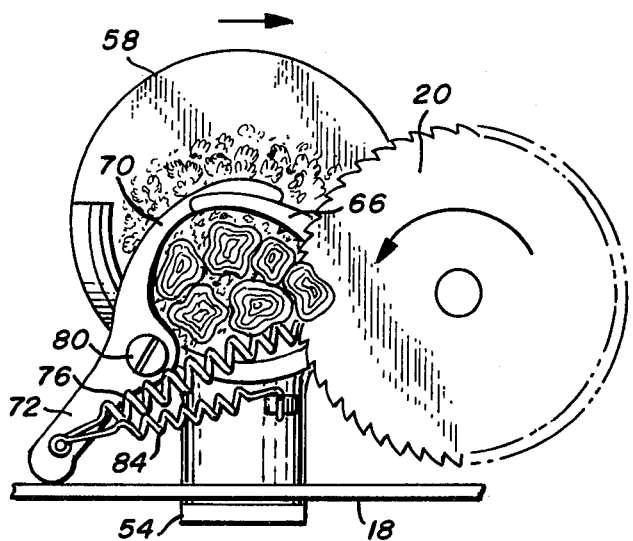
Fig_4
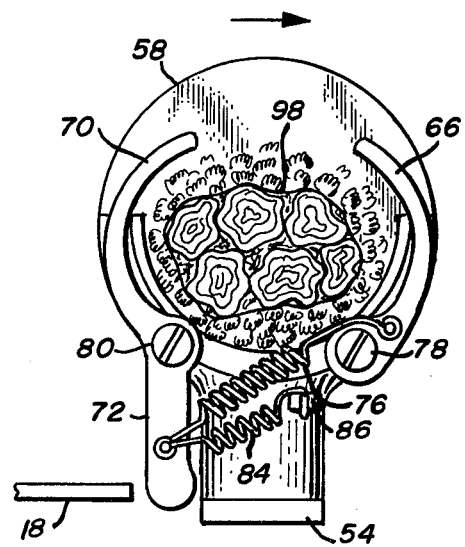
Fig_5

APPARATUS FOR BUNCHING BROCCOLI AND A METHOD THEREFOR

BACKGROUND OF THE INVENTION

1. Field of the Invention

The present invention relates generally to food product bunching devices and, more particularly, to an improved apparatus for bunching and cutting broccoli or the like which automatically forms and maintains the stalks in a predetermined configuration in such a manner as to allow the stalks to be banded after they are cut to a predetermined length, and a method therefor.

2. Description of the Prior Art

Heretofore, broccoli has been formed into bunches manually in the field or in a food processing plant at an individual work station. In a processing plant, a conventional work station includes a member having a cup-like portion for holding several heads of broccoli, and a clamping portion for clamping the butt-ends of the heads, a pneumatic system for energizing the clamping portion and a guillotine or a sliding knife for cutting the clamped heads to a predetermined length. To form the heads into a bunch an operator, from a standing position, places a plastic coated wire on the cup-like portion and then places three or four heads of broccoli in the cup-like portion with their leafy heads against the head plate with their stalks extending away from the operator and over the clamp portion. By depressing a pedal with his foot he actuates the pneumatic system which forces the clamping portion shut and clamps the stalks together. Actuation of the guillotine severs the inverted ends of the broccoli and cuts the clamped heads to a predetermined length. Finally, the operator forms the wire over the clamped heads, twists it several times to tighten it around the butts, deenergizes the clamping portion, and removes the bunched broccoli from the member. However, such a work station suffers from the disadvantage that it does not adequately safeguard the operators from physical injury during the cutting operation. For example, in the past year several operators have been dismembered by falling guillotines. As a result OSHA administrators are considering banning the use of guillotines in vegetable packing plants. Moreover, it should be recognized that broccoli dehydrates during storage, whether it is in shipment or on the produce shelves of a supermarket, grocery store, etc. Consequently, when the broccoli dehydrates the produce manager of the supermarket is required to tighten the wires to prevent the bunches from becoming undone. Typically, this must be done every several days. Because of the labor required to maintain the broccoli in bunches, the corresponding cost to the consumer is necessarily increased. Another disadvantage is that the pneumatic system is typically complex and subject to numerous maintenance difficulties.

SUMMARY OF THE PRESENT INVENTION

It is therefore a primary object of the present invention to provide an automated apparatus for safely forming broccoli into bunches.

Another object of the present invention is to accomplish the previously stated object in a simple manner and to provide a technique for automatically causing a band around each bunch to tighten during dehydration which occurs after the broccoli leaves the packing plant.

Yet another object of the present invention is to provide an apparatus which is operable by an operator of minimum dexterity and who is not required to have formal training in order to execute the function.

Still another object of the present invention is to provide such an apparatus which can be simply maintained.

Yet another object of the present invention is to provide a method for forming broccoli or other elongated vegetables into banded bunches which is simple, relatively inexpensive, and safe.

Briefly, the preferred embodiment includes a frame, a flexible chain formed into an endless band, a motor mounted to the frame for recirculatingly driving the chain in a generally elongated loop, a plurality of members affixed to the chain, each member including a vegetable holding portion and a clamping portion, the holding portion being capable of supporting a plurality of heads of vegetables with their stalks extending in a direction generally normal to the plane of the loop, the clamping portion being movable between an open and a closed position such that when it is in the open position vegetables are able to be placed in the holding portion and when it is the closed position it clamps the stalks of the vegetables in the receiving portion, a cam plate connected to the frame and disposed in the path of the clamping portion for moving the clamping portion from the open to the closed position, and a rotary saw for removing portions of the stalks when the clamping portion is in the closed position, whereby when the chain is recirculated and after vegetables are inserted into the holding portion, the cam plate engages the clamping portion and moves it from the open to the closed position so that continued movement of the chain drives the clamped stalks past the saw which in turn removes undesired portions of the stalks so as to form the vegetables into a predetermined length and enables the stalks to be bound with an elastic band that serves to maintain the vegetables in a bunch, and whereby when the clamping portion moves into the open position out of engagement with the cam plate the bunch of vegetables is capable of being removed from the holding portion.

In another embodiment, a method comprising the steps of providing an endless chain having a plurality of generally U-shaped holders affixed thereto, driving the chain in a loop, placing a predetermined number of heads of broccoli in the holders with the stalks extending in the same direction, clamping the stalks into a predetermined configuration, severing the portions of the stalks that extend beyond a predetermined length, and placing a rubber band around the stalks to form the broccoli into a bunch.

Among the important advantages of the present invention is that it provides bunches of broccoli cut to a predetermined length in a simple, safe, economic and automated manner.

Another advantage of the present invention is that due to it automated nature it is capable of providing increased productivity.

Still another advantage of the present invention is that it provides a technique for automatically tightening the band around each bunch as the broccoli dehydrates.

Yet another advantage of the present invention is that the apparatus is simple in construction and is easily maintained.

These and other objects and advantages of the present invention will no doubt become apparent following a reading of the detailed description of the preferred embodiments which are illustrated in the several figures of the drawing.

IN THE DRAWING

FIG. 2 is a perspective illustration of a broccoli holder component;

FIGS. 3-5 are side elevation views of the broccoli holder taken along the length of the apparatus illustrated in FIG. 1;

DETAILED DESCRIPTION OF THE PREFERRED EMBODIMENTS

Figure 1:
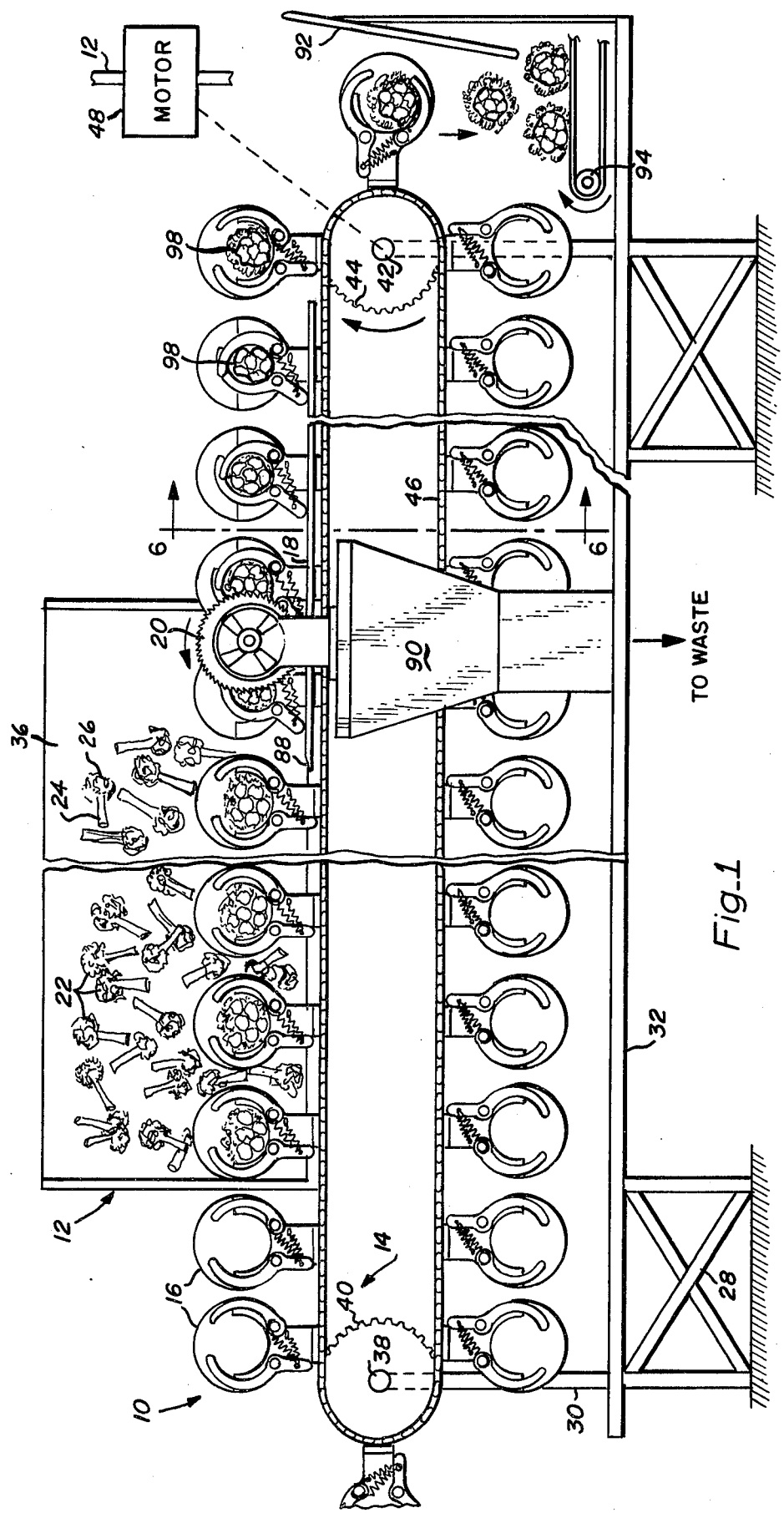
FIG. 1 is a side elevation view schematically illustrating the operative components of a broccoli bunching apparatus in according with the present invention, with portions broken away for clarity.

Referring now to FIG. 1 of the drawing, a broccoli bunching apparatus 10 in accordance with the present invention is illustrated.

The apparatus 10 includes a frame 12, a chain drive mechanism 14, a plurality of broccoli holders 16, a cam plate 18 and a saw 20. The apparatus 10 is adapted to bunch heads of broccoli 22 which has the usual elongated stalk 24 and floret 26 although it should be recognized that it can be used to bunch other types of elongated vegetables and fruits.

The frame 12 (only partially shown) is comprised of elongated rails formed into a base 28 and a generally vertical wall 30 (see FIG. 6) and serves as a support for the other components of the apparatus. A platform 32 is affixed to the base 28 and provides a raised standing area and walkway for the operators. Typically a railing (not shown) is formed along the periphery of the platform 32 for safety purposes. An open ended enclosure or bin 36 mounted to the upper portion of the frame 12 and extending longitudinally along a substantial length of the frame serves to store heads of broccoli 22 for subsequent packing as will be subsequently described in detail. The broccoli are transported to the bin 36 by a conveyor (not shown) or the like.

Figure 6:
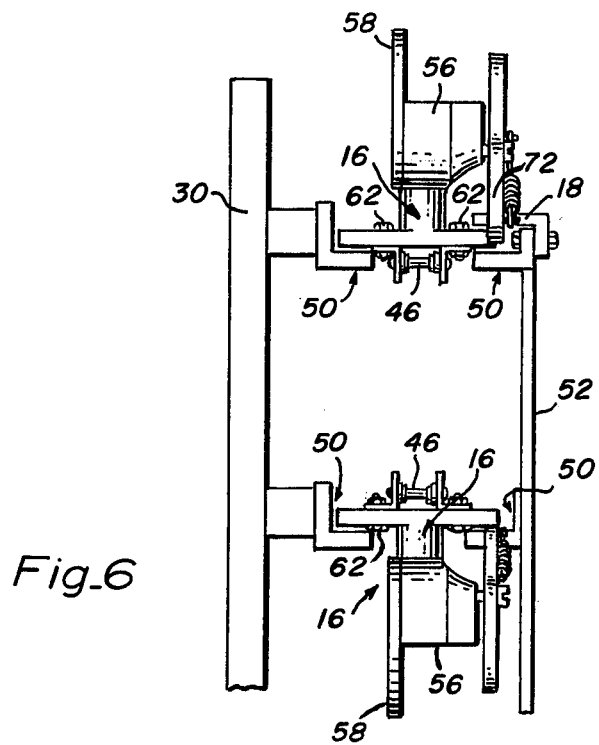
FIG. 6 is a transverse cross section taken through the lines 6—6 of FIG. 1.

The chain drive mechanism 14 includes a shaft 38 and sprocket 40 mounted to one end of the frame 12. A second shaft 42 and sprocket 44 are similarly mounted at the other end of the frame 12. Operatively suspended from the sprockets 40 and 44 is a drive chain 46. The drive chain 46 is formed into an endless band. A motor 48 mounted to the frame 12 is coupled to the shaft 42 and serves to drive the chain 46 along a path that resembles a generally elongated loop. Mounted on either side of the sprockets 40 and 44 and extending along the upper and lower lengths of the chain 46 are a pair of elongated guide members 50. With reference also to FIG. 6, the guide members 50 are formed from angle irons or the like and have a generally L-shape in cross section. The guide members 50 are engaged by the holders 16 as they travel along the loop and serve to support the weight of the holders 16 as well as guide them along the loop so as to reduce the drag on the chain. Braces 52 add strength to the structure formed by the outer pair of guide members 50.

Referring also to FIG. 2, the holder 16 comprises a rectangular base 54, a holding portion 56, a headplate 58 and a clamping assembly 60. The base 54 is affixed to chain 46 with a pair of nut and bolt assemblies 62. The holding portion 56 resembles a shell having a generally U-shape in said elevation view with a generally conoid inner surface 64. The holding portion 56 serves to carry and support a preselected number of heads of broccoli 22. A pair of threaded holes that lie on an imaginary horizontal line and are spaced apart about 4 ½ inches are formed on opposed sides of the front surface of the holding portion. The headplate 58 is generally disk-shaped and is affixed to the rear surface of the holding portion 56 as by welding. The headplate 58 provides a reference surface for the florets 26 of the broccoli so that when the heads are placed on the holding portion 56 with the florets abutting the headplate the stalks 24 extend beyond the front surface of the holding portion. The clamping assembly 60 includes a clamp 66 having a generally arcuate shape, an elongated clamp 68 having a clamp portion 70 with a generally arcuate shape and a plate engaging arm 72, and a coil spring 76 coupled between the plate engaging arm 72 with a screw 77 and the mounting end of the clamp 66. One end of the clamp 66 is pivotally secured to the front surface of the holding portion 56 with a screw 78 disposed through one of the threaded holes. Similarly the clamp 68 is pivotally secured to the opposed side of the front surface of the holding portion with a screw 80 at a location intermediate the clamp portion 70 and the plate engaging arm 72. The end of the arm 72 depends below the base 54 when the clamps 66 and 68 are in the open position and is disposed to engage the plate 18 in a manner which will subsequently be described in detail. Furthermore, with the clamps 66 and 68 in the open position they generally conform to the front surface of the holding portion 56 with their distal ends extending toward each other and spaced apart a distance slightly less than the distance between their pivot points. The coil spring 76 which couples the clamps 66 and 68 together partially conforms to the central surface of the holding portion 56 and provides a support or reference surface for the stalks of the broccoli carried in the holding portion 56. The spring constant of the spring 76 is such as to enable the spring to become arcuately shaped in conformity with the lower portion of the clamped heads of broccoli when the clamps 66 and 68 are moved into the closed position. In the preferred embodiment the spring constant is such as to provide a spring force of about 110 pounds. A return spring 84 is connected between the plate engaging arm 72 at a location below the pivot point with the screw 77 and a boss 86 on the opposed side of the holding portion 56 and serves to bias the clamp 68 into an open position. This causes the clamps 66 and 68 to return to the open position when the arm 72 disengages the plate 18 (see FIG. 5).

In the preferred embodiment, there are about 128 holders affixed to the chain. The headplates of the holders are sequentially painted red, yellow, white and blue. By driving the chain at a suitable angular velocity, the rate at which a particular color headplate passes an operator is such as to facilitate the placing of a head of broccoli in every fourth holder. Alternatively, smaller or larger lengths of chain employing less or more holders and driven at a preselected angular velocity can be utilized.

Turning now to FIGS. 3 and 6, the plate 18 is an elongated member having an inclined leading surface 88. The plate 18 is secured to the outer one of the upper guide members 50 with bolts or the like in such a manner as to engage the arm 72 when the holders 16 are driven along the prescribed path (see FIG. 6). The leading surface 88 provides a ramp which urges the arm 72 upwardly and causes it to rotate in a clockwise direction as it engages the plate 18. The vertical dimension of the plate 18 is such as to cause the clamps 66 and 68 to move from the open to the closed position when the arm 72 rides on the plate 18.

The saw 20, as illustrated in FIGS. 1 and 4, is mounted to the frame 12 at a location along the plate 18 with its blade disposed in a plane parallel to the headplate 58, and hence to the plane of the chain 46, a predetermined distance from the headplate. When the heads of broccoli are disposed in the holding portion 56 with their florets against the headplate 58 and the stalks clamped by the clamping assembly, the saw 20 serves to sever the portions of the stalks that extend beyond the predetermined dimension. In the preferred embodiment, the blade is disposed between 7¾ inches and 8 inches from the headplate and is of the type commonly used to cut walnuts. A metal chute 90 is mounted to the frame 12 subjacent the saw 20 and severs as a conduit for disposing of the waste portion of the stalk. The chute 90 terminates at a dumping area (not shown) from which such waste is collected and thereafter removed.

Referring again to FIG. 1, it will be noted that a shield 92 is operatively disposed at a suitable distance to the right of the sprocket 44 and severs to direct the bunches of broccoli that are released from the holders 16 into a pick-up conveyor 94. The conveyor 94 carrier them away from the apparatus to a packing station (not shown) wherein they are removed and packaged for shipment.

In operation with the motor 48 energized, the chain 46 is driven in a clockwise direction in an elongated loop around the sprockets 40 and 44. Operators (not shown) standing on the platform 32 to the left of the saw 20 and the leading edge of the plate 18 take one or more heads of broccoli 24 out of the storage bin 36 and place it in one of the holders 16 passing in front of the operator with its floret 26 abutting the headplate 58 and with its stalk 24 extending outwardly over the spring 76. Typically twelve operators stand side-by-side on the platform 32 and each adds heads in every fourth holder until the holder contains the desired number that are to be formed into the bunch. As the filled holders 16 reach the plate 18, the lower end of the arm 72 engages the beveled leading edge surface 88 of the plate. Continued movement of the chain 46 causes the arm 72 to ride up the surface and pivot about the screw 80 in a clockwise manner. This causes the coil spring 76, that serves as the lower reference surface for the heads, to stretch and deform into a generally arcuate shape and to force the clamps 66 and 68 into a closed position, with the clamp portions 70 and 66 and the spring 76 enclosing the extending stalks (see FIG. 3). Thus, clamps 66 and 68 and the spring 76 envelope the stalks so as to positively form them into the desired generally circular configuration as they pass along the plate 18.

Since the head of broccoli is placed into the holder in thesame position it will be readily apparent that it could alternatively be loaded into the holders by a conveyor means so that the entire operation could be automated.

Referring now to FIGS. 3 through 6, the manner in which the broccoli is held, sawed to a predetermined length, banded and released before being discharged from the holder is illustrated in detail. In FIG. 3, as previously described, the broccoli is formed into the desired configuration and held in such position as the holder is drawn over the plate. Shortly thereafter, the holder passes behind the saw 20, as shown in FIG. 4, which severs the butts of the stalks and hence forms the bunch into a predetermined length while providing cut ends having a generally smooth and regular appearance. The severed butts drop into the chute 90 and pass under the force of gravity to a waste removal station (not shown).

As the holder 16 is drawn past the saw, an operator places a band 98 formed from elastic material, such as rubber or the like, over the exposed end of the stalks and slides the band along the stalk to a location near the florets. The band 98 maintains the heads in a generally tight bunch. Consequently during subsequent dehydration of the broccoli, the band automatically conforms to the smaller diameter of the bunch. A short distance downstream, as illustrated in FIG. 5, the holder 16 passes the trailing end of the plate 18. Once the arm 72 becomes disengaged from the plate, the force associated with the return spring 84 causes the arm 72 to pivot in a counterclockwise direction about the screw 80 until the clamps 66 and 68 move into the open position.

After the holder 16 passes over the sprocket 44 the bound bunch of broccoli drops out of the holder due to the force of gravity and onto the pick-up conveyor 94 which carrier them along to a packing station.

It should be recognized that broccoli often becomes slightly discolored and takes on a yellowish appearance, especially during the summer months. In such instances it may be desirable to spray the florets with an edible food dye, of the type which does not arrest the enzymes, as the bunches are carried on the conveyor 94.

Figure 7:
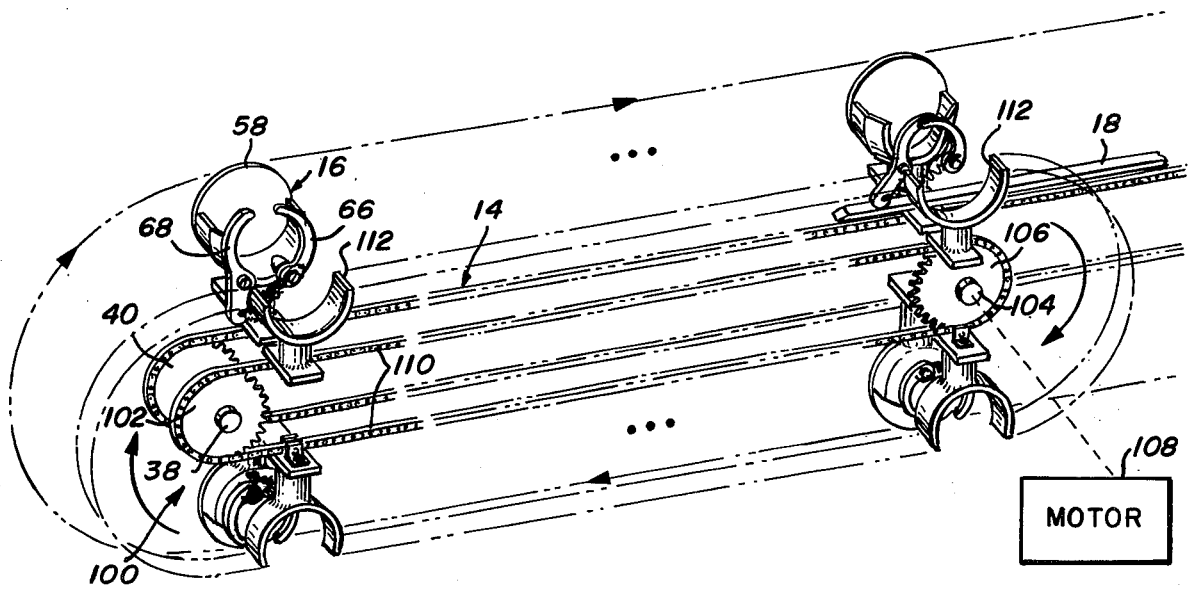
FIG. 7 is a perspective illustration of an alternative embodiment of the present invention.

Referring now to FIG. 7, an alternative embodiment of the holding apparatus is illustrated. In this embodiment, a second chain apparatus 100 is disposed in front of the chain drive mechanism 14. More particularly, a sprocket 102 is mounted on the shaft 38 in front of the sprocket 40 and a shaft 104 carrying a sprocket 106 and driven by a motor 108 is mounted to the frame (not shown), at a location to the right of the leading ramp-shaped surface of the plate 18. A chain 110, similar to the chain 46, is formed into an endless band and operatively suspended from the spockets 102 and 106. A plurality of butt-support cups 112 are affixed to the chain 110 at longitudinally spaced-apart intervals that are substantially identical to the intervals between the holders 16. The cups 112 move longitudinally at the same rate as the holders 16 so that there is no difference in velocity between such elements in the interval between the sprocket 40 and the plate 18.

The cups 112 have a generally U-shape in side view with the bight portion of the cup being substantially the same elevation as the bight portion of the holder 16 when the holder passes the sprocket 40.

Furthermore, the cups 112 are disposed in front of the holders 16 by a distance which enables them to support the butt ends of the broccoli when the broccoli is placed in the holder. In the preferred embodiment, the cups are formed from lengths of half-sections of tubes of polyvinyl chloride material having a 4-inch diameter.

In operation, the motor 108 drives the shaft 104 at a rate such that the cup 112 travels longitudinally in sync with a corresponding holder 16. The operators put heads of broccoli in the holder with their florets against the headplate 58 and with their stalks supported by the cups 112. After the holder 16 reaches the plate 18 and the clamps 66 and 68 are moved to the closed position, in a manner similar to that previously described, the chain 110 recirculates the cups for another supporting operation. It should be recognized that the transverse dimension of the holders can be much less than that of the holder described in the preferred embodiment.

Although not shown, in yet other embodiments drives which are capable of providing interrupted or sequential motion of the holders, such as drives of the Geneva type, can also be utilized.

From the above it will be seen that there have been provided a vegetable processing apparatus and a method for forming vegetables into bunches which fulfill all of the objects set forth above.

While the invention has been particularly shown and described with reference to two embodiments, it will be understood by those skilled in the art that various alterations and modifications in form and detail may be made therein. Accordingly, it is intended that the following claims cover all such alterations and modifications as fall within the true spirit and scope of the invention.

What is claimed is:

1. A method of forming vegetables with elongated stalks into bunches comprising:
   providing a generally U-shaped holder;
   driving said holder in a loop configuration;
   placing a plurality of heads of vegetables into said holder with the stalks extending in generally the same direction;
   clamping said stalks into a predetermined configuration;
   removing portions of said stalks that extend beyond a predetermined length; and thereafter
   inserting a band formed of an elastic material around said stalks while the stalks are clamped into a predetermined configuration to form the heads of vegetables into a bunch.

2. A method of forming vegetables as recited in claim 1 wherein the step of clamping includes the steps of providing an element in the path of said holder;
   providing a clamping apparatus that is movable between an open and a closed position on said holder;
   engaging said element with said clamping apparatus; and
   moving said clamping apparatus from said open to said closed position.

3. A method of forming vegetables as recited in claim 1 wherein the step of removing includes providing a saw, and driving said holder past said saw.

4. A method of forming vegetables as recited in claim 1 and further comprising removing said bunch of vegetables from said holder following the step of inserting a band.

5. A method of forming vegetables as recited in claim 1 and further comprising the step of supporting the stalks of the vegetables prior to the step of clamping said stalks.

6. Apparatus for bunching vegetables having a stalk comprising:
   a chain formed into an endless band;
   first means for driving said chain in a generally elongated loop;
   a plurality of members affixed to said chain, each member including a vegetable holding portion and a clamping portion, said holding portion being capable of supporting a plurality of heads of vegetables, said clamping portion including a first clamp having an arm portion and a stalk engaging portion, said first clamp being pivotally affixed to said holding portion at a location intermediate said arm portion and said stalk engaging portion, a second clamp pivotally affixed to said holding portion and being pivotable between an open position and a closed position and second means formed of a resilient material interconnecting said first and second clamps and being capable of pivoting said second clamp such that when said second clamp is in said open position, vegetables are able to be placed in said holding portion with their stalks extending beyond said clamping portion and when said second clamp is in said closed position, the stalks of the vegetables in said clamping portion are clamped;
   an elongated element disposed in the path of said arm portion for pivoting said first clamp; and
   third means for removing portions of the stalks when said second clamp is in said closed position, whereby when said chain is driven and after vegetables are inserted into said holding portion, said arm portion engages said elongated element and pivots said stalk engaging portion and hence said second clamp into said closed position, such that said stalk engaging portion, said second clamp and said means clamp the stalks of the vegetables in said holding portion so that continued movement of said chain drives the clamped stalks past said third means which in turn removes undersired portions of the stalks so as to form the vegetables into a predetermined length and hence enables the stalks to be bound with an elastic band that serves to maintain the vegetables in a bunch, and whereby when said arm portion moves out of engagement with said elongated element and said second clamp pivots into said open position, the bunch of vegetables is capable of being removed from said holding portion.

7. Apparatus for bunching vegetables as recited in claim 6 wherein said clamping portion further includes fourth means formed from a resilient material for urging said first and second clamps into said open position when said arm portion moves out of engagement with said elongated element.

8. Apparatus for bunching vegetables as recited in claim 6 wherein said stalk engaging portion and said second clamp have generally arcuate shapes.

9. Apparatus for bunching vegetables as recited in claim 6 wherein said elongated element has a leading surface that is generally ramp-shaped and serves to cam said arm portion into said closed position.

10. Apparatus for bunching vegetables as recited in claim 6 wherein each said member includes a headplate affixed to said holding portion opposite said clamping portion and serving to provide a reference surface for use in positioning the heads of vegetables.

11. Apparatus for bunching vegetables as recited in claim 10 wherein said third means is a saw disposed generally parallel to said headplate.

12. Apparatus for bunching vegetables as recited in claim 6 and further comprising support means disposed upstream of said elongated element for supporting the butt ends of the stalks when said second clamp is in said open position.

13. Apparatus for bunching vegetables having a stalk comprising:
   a frame;
   a chain formed into an endless band;
   first means mounted to said frame for driving said chain in a generally elongated loop;
   a plurality of members affixed to said chain, each member including a vegetable holding portion and a clamping portion, said holding portion being capable of supporting a plurality of heads of vegetables with their stalks extending in a direction generally normal to the plane of said loop, said clamping portion including a first clamp having an arm portion and a stalk engaging portion, said first clamp being pivotally affixed to said holding portion at a location intermediate said arm portion and said stalk engaging portion, a second clamp pivotally affixed to said holding portion and being pivotal between an open and a closed position, and second means formed of a resilient material interconnecting said first and second clamps and being capable of pivoting said second clamp such that when said second clamp is in said open position, vegetables are able to be placed in said holding portion and when said secured clamp is in said closed position, the stalks of the vegetables in said holding portion are clamped;

third means connected to said frame and disposed in the path of said arm portion for pivoting said first clamp; and fourth means for removing portions of the stalks when said second clamp is in said closed position, whereby when said chain is driven and after vegetables are inserted into said holding portion, said arm portion engages said third means and pivots said stalk engaging portion and hence said second clamp into said closed position, such that said stalk engaging portion, said second clamp and said second means clamp the stalks of the vegetables in said holding portion so that continued movement of said chain drives the clamped stalks past said fourth means which in turn removes undersired portions of the stalks so as to form the vegetables into a predetermined length and hence enables the stalks to be bound with an elastic band that serves to maintain the vegetables in a bunch, and whereby when said arm portion moves out of engagement with said third means and said second clamp pivots into said open position, the bunch of vegetables is capable of being removed from said holding portion.

14. Apparatus for bunching vegetables as recited in claim 13 wherein said clamping portion further includes fifth means formed from a resilient material for urging said first and second clamps into said open position when said arm portion moves out of engagement with said second means.

15. Apparatus for bunching vegetables as recited in claim 13 wherein said stalk engaging portion and said second clamp have generally arcuate shapes.

16. Apparatus for bunching vegetables as recited in claim 13 wherein said second means comprises an elongated element having a leading surface that is generally ramp-shaped and serves to cam said arm portion.

17. Apparatus for bunching vegetables as recited in claim 13 wherein each said member includes a headplate affixed to said holding portion opposite said clamping portion and serving to provide a reference surface for use in positioning the heads of vegetables.

18. Apparatus for bunching vegetables as recited in claim 13 and further comprising support means disposed upstream of said third means for supporting the butt ends of the stalks when said clamping portion is in said open position.

* * * * *